(12) United States Patent
Cherubini et al.

(10) Patent No.: US 9,305,580 B2
(45) Date of Patent: Apr. 5, 2016

(54) TAPE HEAD ASSEMBLY FOR LINEAR TAPE OPEN

(71) Applicant: International Business Machines Corporation, Armonk, NY (US)

(72) Inventors: Giovanni Cherubini, Rueschlikon (CH); Simeon Furrer, Rueschlikon (CH); Jens Jelitto, Rueschlikon (CH); Mark A. Lantz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/793,984

(22) Filed: Jul. 8, 2015

(65) Prior Publication Data

US 2015/0332718 A1    Nov. 19, 2015

Related U.S. Application Data

(62) Division of application No. 14/488,551, filed on Sep. 17, 2014, now Pat. No. 9,177,571.

(30) Foreign Application Priority Data

Sep. 30, 2013    (GB) .................................... 1317264.8

(51) Int. Cl.
| | | |
|---|---|---|
| G11B 5/584 | (2006.01) | |
| G11B 5/008 | (2006.01) | |
| G11B 5/48 | (2006.01) | |
| G11B 20/10 | (2006.01) | |
| G11B 5/55 | (2006.01) | |
| G11B 5/60 | (2006.01) | |

(52) U.S. Cl.
CPC ............ *G11B 5/584* (2013.01); *G11B 5/00817* (2013.01); *G11B 5/00826* (2013.01); *G11B 5/4893* (2013.01); *G11B 20/10009* (2013.01); *G11B 5/5508* (2013.01); *G11B 5/6005* (2013.01)

(58) Field of Classification Search
None
See application file for complete search history.

(56) References Cited

U.S. PATENT DOCUMENTS

| | | | | |
|---|---|---|---|---|
| 5,291,348 | A * | 3/1994 | Copolillo | G11B 5/00817 360/77.07 |
| 8,488,267 | B2 * | 7/2013 | Fasen | G11B 5/584 360/73.12 |
| 8,988,817 | B1 * | 3/2015 | Cherubini | G11B 5/584 360/77.12 |
| 2004/0223248 | A1 * | 11/2004 | Dugas | G11B 5/00813 360/48 |
| 2007/0097537 | A1 * | 5/2007 | Hoerger | G11B 5/584 360/55 |
| 2007/0242377 | A1 * | 10/2007 | Hiura | G11B 5/588 360/39 |
| 2008/0266705 | A1 * | 10/2008 | Saliba | G11B 5/584 360/31 |

(Continued)

OTHER PUBLICATIONS

List of IBM Patents or Patent Applications Treated as Related; Jul. 8, 2015, pp. 1-2.

*Primary Examiner* — Tan X Dinh
(74) *Attorney, Agent, or Firm* — Cantor Colburn LLP

(57) ABSTRACT

A tape head assembly includes a set of data readers configured to simultaneously read data from a set of adjacent data tracks of a tape storage medium, each data track having a width; wherein the width of each data reader of the set along a lateral extension of the tape head assembly is equal to or less than the width of a data track wherein the lateral extension of the tape head assembly is orthogonal to a longitudinal extension of the tape storage medium when arranged in a tape drive containing the tape head assembly spanning at least the set of data tracks during reading; and a servo reader arrangement containing at least one servo reader arranged laterally offset from one of the data readers by less than the width of a data track.

9 Claims, 4 Drawing Sheets

(56) References Cited

U.S. PATENT DOCUMENTS

| | | | |
|---|---|---|---|
| 2009/0316296 A1* | 12/2009 | Cherubini | G11B 5/58 360/76 |
| 2013/0321949 A1* | 12/2013 | Cherubini | G11B 5/187 360/77.13 |
| 2014/0139944 A1* | 5/2014 | Johnson | G11B 5/584 360/75 |
| 2015/0062740 A1* | 3/2015 | Cherubini | G11B 20/1204 360/48 |
| 2015/0092294 A1 | 4/2015 | Cherubini et al. | |
| 2015/0092295 A1 | 4/2015 | Cherubini et al. | |
| 2015/0146320 A1 | 5/2015 | Cherubini et al. | |

* cited by examiner

TAPE HEAD ASSEMBLY FOR LINEAR TAPE OPEN

DOMESTIC AND FOREIGN PRIORITY

This application is a divisional application of U.S. patent application Ser. No. 14/488,551, filed Sep. 17, 2014, which claims priority to Great Britain Patent Application No. 1317264.8, filed Sep. 30, 2013, and all the benefits accruing therefrom under 35 U.S.C. §119, the contents of which in its entirety are herein incorporated by reference.

BACKGROUND

The present invention relates to a method for operating a tape storage system, a tape head assembly and a tape storage system.

A conventional tape storage medium typically comprises servo information prerecorded in dedicated servo bands that extend next to data bands for storing data, which servo bands and data bands extend in a longitudinal direction along the tape medium. For example, according to the LTO (Linear Tape Open) Ultrium specification four data bands are straddled by five servo bands. For reading and/or writing data from/to a data band a tape head assembly is positioned to span the entire width of the data band and at least parts of the two servo bands adjacent to the data band. The tape head assembly comprises a set of data readers and writers, e.g., sixteen or thirty-two, arranged next to each other along a lateral extension of the tape head assembly orthogonal to the longitudinal extension of the tape storage medium when being inserted in a tape drive containing the tape head assembly. The tape head assembly further comprises at least two servo readers at the edges of the set of data readers and writers, so that the data readers and data writers are located between the servo readers. The servo readers are provided for reading servo information from two adjacent servo bands. The servo information in the servo bands typically allows for determining several essential servo parameters, e.g., a lateral position of the tape storage medium with respect to the tape head assembly, a tape velocity, and a longitudinal tape position.

For writing data to the data band the tape head assembly is set to a desired lateral position on the tape storage medium and data is written simultaneously by the data writers of the set while the tape storage medium is moved across the tape head assembly in a first direction, e.g., in a forward motion direction. When the tape head assembly has reached the end of the tape storage medium, the tape head assembly is set to a different lateral position, i.e., laterally offset to the previous position, the tape motion direction is reversed and data is continued to be written simultaneously by the data writers of the set while the tape storage medium is moved across the tape head assembly in the reverse motion direction. Hence, the data band is recorded in a serpentine fashion.

A data track is referred to as a longitudinal track within a data band written by a single data writer. In serpentine recording, a set of data tracks written at the same time is referred to as a wrap. In serpentine recording, a set of data tracks written by the same data writer within the data band is also referred to as a data sub-band. The number of data tracks contained in a data sub-band, which also represents the number of wraps in the data band, depends on a width of the data band, a width of the data writers and a resolution of lateral position information that is enabled by the servo patterns in the servo band. In order to enable writing in the serpentine fashion, the data writers are arranged offset from each other on the tape head assembly along its lateral extension. A distance between two adjacent data writers may be set to the number of wraps to be recorded in the data band times the width of a data track such that data tracks written in the same wrap are offset from each other for leaving a gap in between for writing data tracks in subsequent wraps into the gap.

The servo information prerecorded in the servo bands allows for identifying a lateral position of the tape storage medium with respect to the tape head assembly when being read by the dedicated servo readers. Based on the identified lateral position the tape head assembly may also be set to a new desired lateral position at the end of a wrap for writing a new wrap in a reverse motion direction of the tape storage medium. In addition, the prerecorded servo information allows for determining a lateral deviation of the tape storage medium from a desired lateral position during writing and/or reading data. For this purpose, a position error signal representing the lateral deviation may be translated into a control signal for an actuator for controlling a lateral position of the tape head assembly with respect to the tape storage medium.

In an alternate way of writing data to a tape storage medium, which is also referred to as adjacent track recording, the tape head assembly being a part of a tape head and containing a transducer array no longer spans the entire width of a data band as defined above but only spans a portion of the width of the data band. Again, the tape head assembly may contain a set of data readers and writers which are now arranged next to each other along a lateral extension of the tape head assembly orthogonal to the longitudinal extension of the tape storage medium when being inserted in a tape drive containing the tape head assembly. While in serpentine recording the data writers of the set are arranged laterally offset from each other the data writers are now preferably arranged close to each other without a significant gap in between such that data tracks written simultaneously by the data writers are arranged adjacent to each other in the data band. Given that no additional data tracks are to be recorded in between two adjacent data tracks there is no need for a significant gap in between. Hence, data written by adjacent data writers result in adjacent data tracks on the data band while in serpentine recording data tracks written by adjacent data writers in one pass result in data tracks gapped from each other. In the latter case, the gap is filled or respectively will be filled by data tracks written or to be written in different wraps.

In adjacent track recording the set of data tracks simultaneously written next to each other during the tape storage medium moving across the tape head assembly is also referred to as a data sub-band. The number of data sub-bands within a given width of the tape depends on the width of the tape head assembly. Once a data sub-band is written and the tape head assembly has reached the end of the tape storage medium, the tape head assembly is set to a new lateral position with respect to the tape storage medium for writing another data sub-band in a reverse tape motion direction. The offset of the new lateral position to the previous lateral position is at least the width of the tape head assembly to avoid overwriting of the previously written data sub-band.

An advantage offered by adjacent track recording is given by the reduced width of the tape head assembly compared to the width of the tape head assembly in the serpentine recording. By having reduced the total span of the tape head assembly and making a channel pitch, i.e., a pitch between adjacent data readers or writers, equal to the track pitch, environmental effects known as tape dimensional stability effects can be reduced. For example, the tape storage medium may laterally expand or contract dependent on variations in temperature and/or in humidity. Such expansion or contraction may more adversely impact the writing and reading of data the larger the tape head assembly span is.

SUMMARY

In one embodiment, a method for operating a tape storage system includes simultaneously receiving readback signals from a set of data readers reading from data tracks of a set of adjacent data tracks extending along a longitudinal extension of a tape storage medium wherein each data track of the set has a width and each data reader of the set has a width equal to or less than the width of a data track; simultaneously with receiving the readback signals from the set of data readers, receiving readback signals from a servo reader arrangement containing at least one servo reader arranged laterally offset from one of the data readers by less than the width of a data track; and determining at least one of lateral position, velocity, gain and timing information dependent on the readback signals of each servo reader in the servo reader arrangement.

In another embodiment, a non-transitory, computer readable storage medium having computer readable instructions stored thereon that, when executed by a computer, implement a method for operating a tape storage system. The method includes simultaneously receiving readback signals from a set of data readers reading from data tracks of a set of adjacent data tracks extending along a longitudinal extension of a tape storage medium wherein each data track of the set has a width and each data reader of the set has a width equal to or less than the width of a data track; simultaneously with receiving the readback signals from the set of data readers, receiving readback signals from a servo reader arrangement containing at least one servo reader arranged laterally offset from one of the data readers by less than the width of a data track; and determining at least one of lateral position, velocity, gain and timing information dependent on the readback signals of each servo reader in the servo reader arrangement.

In another embodiment, a tape head assembly includes a set of data readers configured to simultaneously read data from a set of adjacent data tracks of a tape storage medium, each data track having a width; wherein the width of each data reader of the set along a lateral extension of the tape head assembly is equal to or less than the width of a data track wherein the lateral extension of the tape head assembly is orthogonal to a longitudinal extension of the tape storage medium when arranged in a tape drive containing the tape head assembly spanning at least the set of data tracks during reading; and a servo reader arrangement containing at least one servo reader arranged laterally offset from one of the data readers by less than the width of a data track.

BRIEF DESCRIPTION OF THE SEVERAL VIEWS OF THE DRAWINGS

The invention and its embodiments will be more fully appreciated by reference to the following detailed description in accordance with embodiments of the present invention when taken in conjunction with the accompanying drawings.

DETAILED DESCRIPTION

Figure 1:
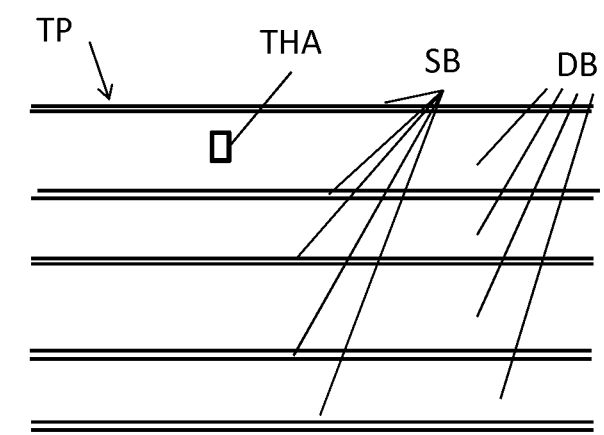
FIG. 1 is a top view of a schematic tape storage system according to an embodiment of the present invention.

According to an embodiment of a first aspect of the present invention, a method for operating a tape storage system is provided in which readback signals from a set of data readers are simultaneously received which data readers read from data tracks of a set of adjacent data tracks extending along a longitudinal extension of a tape storage medium wherein each data track of the set has a width and each data reader of the set has a width equal to or less than the width of a data track. Simultaneously to receiving the readback signals from the set of data readers readback signals are received from a servo reader arrangement containing at least one servo reader arranged laterally offset from one of the data readers by less than the width of a data track. At least one of lateral position, velocity, gain and timing information is determined dependent on the readback signals of each servo reader in the servo reader arrangement.

In embodiments, the method may comprise one or more of the following features: the at least one of lateral position, velocity, gain and timing information is determined dependent on the readback signals of each servo reader in the servo reader arrangement and dependent on the readback signal of the one data reader; receiving readback signals from a number of servo readers in the servo reader arrangement that is less than half the number of the data readers in the set; receiving the readback signals from the servo reader arrangement containing two servo readers a first one of which is laterally offset the one data reader by a positive offset value and a second one of which is laterally offset from the one data reader by a negative offset value, and determining the at least one of lateral position, velocity, gain and timing information dependent on the readback signals of the two servo readers and optionally further the readback signal of the one data reader; determining the at least one of lateral position, velocity, gain and timing information by correlating the readback signals of the two servo readers with the readback signal of the one data reader; simultaneously to receiving the readback signals from the set of data readers receiving readback signals from another servo reader arrangement assigned to another one of the data readers, the other servo reader arrangement containing at least one servo reader being laterally offset from the other one data reader by less than the width of a data track, and determining at least one of lateral position, velocity, gain and timing information dependent on the readback signals of each servo reader in the other servo reader arrangement; receiving the readback signals from the other servo reader arrangement containing two servo readers a first one of which is laterally offset by a positive offset value and a second one of which is laterally offset by a negative offset value, and determining at least one of lateral position, velocity, gain and timing information dependent on the readback signals of the two servo readers in the other servo reader arrangement and the readback signal of the other one data reader; determining at least one of lateral position, velocity, gain and timing information by correlating the readback signals of the two servo readers of the other servo arrangement with the readback signal of the other one data reader; the data tracks of the set are written simultaneously by means of a set of data writers, the number of data writers in the set corresponds to the number of data tracks in the set, and the data writers of the set are arranged offset from each other with respect to the longitudinal extension of the tape storage medium; writing to a data track associated with the one data reader includes one of: exclusively writing data; exclusively writing servo patterns; alternate writing data sections and servo sections each servo section containing one or more defined servo patterns.

According to an embodiment of another aspect of the present invention, a tape head assembly is provided for reading data from a set of adjacent data tracks of a tape storage medium, each data track having a width. The tape head assembly comprises a set of data readers for simultaneously reading data from the data tracks of the set. The width of each data reader of the set along a lateral extension of the tape head assembly is equal to or less than the width of a data track wherein the lateral extension of the tape head assembly is orthogonal to a longitudinal extension of the tape storage medium when being arranged in a tape drive containing the tape head assembly spanning at least the set of data tracks during reading. The tape head assembly comprises a servo reader arrangement containing at least one servo reader arranged laterally offset from one of the data readers by less than the width of a data track.

In embodiments, the tape head assembly may comprise one or more of the following features: each servo reader of the servo reader arrangement has a width equal to the width of a data reader; the number of servo readers is less than half the number of the data readers in the set; each data reader has a width wDR=d*wDT, with wDT being the width of a data track and $0.8 \leq d \leq 1$; each servo reader of the servo reader arrangement is offset from the one data reader by an offset=f*wDT, with wDT being the width of a data track and $0.3 \leq |f| \leq 0.7$; the servo reader arrangement contains two servo readers wherein a first one of the two servo readers is laterally offset by a positive offset value and a second one of the two servo readers is laterally offset by a negative offset value; each servo reader of the servo reader arrangement is offset from the one data reader by an offset=f*wDT, with wDT being the width of a data track and $|f|=0.5$; each servo reader of the servo reader arrangement has a width less than the width of a data track; the servo reader arrangement contains a single servo reader which is offset from the one data reader by an offset=f*wDT, with wDT being the width of a data track and $0.5 \leq |f| \leq 0.7$, and whose servo reader width is g*wDT, with $1.0 \leq |g| \leq 1.5$; another servo reader arrangement containing at least one servo reader; the other servo reader arrangement contains a number of servo readers less than half the number of the data readers in the set; the other servo reader arrangement contains two servo readers arranged laterally offset from another one of the data readers by less than the width of a data track; the data readers of the set are arranged in at least one row in the tape head assembly; the one or more servo readers are arranged in at least one different row in the tape head assembly at a different longitudinal position than the at least one row containing the data readers.

According to an embodiment of another aspect of the present invention, a tape storage system is provided comprising a tape head assembly according to any one of the previous embodiments, and a tape storage medium. The tape storage medium comprises at least one set of data tracks along a longitudinal extension of the tape storage medium and adjacent to each other. At least one data track of the set comprises one of servo sections or data sections alternating with servo sections.

According to an embodiment of a further aspect of the present invention, a computer program product is provided comprising a computer readable medium having computer readable program code embodied therewith, the computer readable program code comprising computer readable program code configured to perform a method according to any of the previous embodiments.

Embodiments described in relation to the aspect of write head shall also be considered as embodiments disclosed in connection with any of the other categories such as the method.

A tape storage medium for storing data (also abbreviated as tape), and in particular a magnetic tape storage medium may be arranged in a cartridge which cartridge may be inserted into a tape drive for reading data from the tape storage medium and writing data to the storage tape medium. The tape storage medium has a longitudinal extension and a width orthogonal to its longitudinal extension. The tape is wound onto one or more reels which are driven by the tape drive in order to make the tape pass by data readers and writers of a tape head assembly for reading and/or writing data from and/or to the tape storage medium.

In connection with embodiments of the invention, a set of adjacent data tracks is written to the tape storage medium preferably in one pass, i.e., simultaneously by means of a tape head assembly comprising a number of data writers that corresponds to the number of data tracks in the set. The set of tracks written in one pass is also denoted as data sub-band. Adjacent in this context means that the data tracks written at the same time are arranged next to each other and remain in this adjacent arrangement even after additional data sub-bands will have been written by the tape head assembly. The adjacent data tracks in a sub-band preferably do not show a significant gap in between. Any gap width is assumed to be smaller than a track width. Preferably, assuming that the data writers are placed in a staggered fashion in the head assembly and assuming that the data writer width is larger than the pitch between adjacent writers, each track written by a data writer is partially overwritten by the track written by the adjacent data writer, i.e., shingled writing is applied. In contrast, in serpentine recording data tracks written in one pass by data writers of a tape head assembly result in data tracks gapped from each other which gap is going to be filled by data tracks written in different wraps. For example, in case the desired width of a data track is 2 μm and 30 data tracks are written in one pass in adjacent track recording, the width of the entire set of data within a sub-band written by the data writers in one pass may be as small as 2 μm×30. In contrast, in serpentine recording, the lateral distance between two data readers in the tape head assembly may e.g., be in the range of 80 μm in order to reserve enough space for other data tracks written in between in future passes of the tape head assembly.

In adjacent track recording, the number of data sub-bands within given width of the tape depends on the width of the tape head assembly. Once a data sub-band is written and the tape head assembly has reached the end of the tape storage medium, the tape head assembly is set to a new lateral position with respect to the tape storage medium for writing another data sub-band in a reverse tape motion direction. The new lateral position of the tape head assembly with respect to its previous lateral position is at least the width of the set of tracks to avoid overwriting of the previously written data sub-band is not desired to be overwritten.

As a result of the foregoing, in a tape head assembly according to an embodiment of the present invention, the data writers are arranged offset from each other in the lateral dimension by less than twice the data track width, and most preferably by the data track width. The width of a data writer is slightly larger than the track width, e.g., in the range [1 . . . 1.2] times the track width, to allow shingled recording. Lateral in this context denotes in the dimension orthogonal to the longitudinal extension of the tape storage medium when arranged underneath the tape head assembly for reading and/or writing data therefrom/thereto. In view of the close proximity between adjacent data writers, crosstalk may occur during data writing. Hence, adjacent data writers are arranged offset from each other in the longitudinal dimension of the tape head assembly for reducing crosstalk during writing. Such arrangement is also referred to as staggered arrangement.

Due to adjacent track recording, it is desirable to also read the concurrently written set of adjacent data tracks in one pass, i.e., simultaneously by means of a set of data readers of the tape head assembly. The number of the data readers in the set preferably corresponds to the number of data tracks.

Therefore, according to an aspect of the present invention, a tape head assembly is provided for reading data from a set of adjacent data tracks of a tape storage medium. The tape head assembly contains a set of data readers for simultaneously reading data from the data tracks of the set. The width of each data reader is equal to or less than the width of a data track of the set. It is assumed that the data tracks of the set each have a width orthogonal to a longitudinal extension of the tape storage medium, and preferably all the data tracks of the set have the same width such that each data reader of the set has a width along a lateral extension of the tape head assembly less than the width of each data track. The lateral extension of the tape head assembly is defined correspondingly as orthogonal to the longitudinal extension of the tape storage medium when arranged in a tape drive containing the tape head assembly which then spans at least the set of data tracks during reading. Preferably, each data reader of the set has a width wDR=d*wDT, with wDT being the width of a data track and 0.8≤d≤1. Preferably, each data reader of the set has the same width. It is further desirable that centers of the data readers are laterally offset from each other in the tape head assembly by the width of the data track. The center is defined as the geometrical center of a data reader in the lateral dimension. It is also desirable that the data readers of the set are arranged in a row in the tape head assembly at a common longitudinal position.

The tape head assembly further comprises a servo reader arrangement containing at least one, and preferably two servo readers arranged laterally offset from one of the data readers by less than the width of a data track. Each servo reader preferably has a width equal to or less than the width of a data track, and preferably has a width wSR=d*wDT, with wDT being the width of a data track and 0.8≤d≤1. Preferably, each servo reader of the servo reader arrangement has the same width, and preferably the servo readers have the same width as the data readers. Each servo reader of the servo reader arrangement shows a defined offset with respect to the same one data reader which offset preferably is offset=f*wDT, with wDT being the width of a data track and 0.3≤|f|≤0.5. In one embodiment the lateral offset is half of the width of a data track for each servo reader. In an embodiment with only one servo reader in the servo reader arrangement, the servo reader has an offset=f*wDT from the one data reader, with wDT being the width of a data track and 0.5≤|f|≤0.7, and servo reader width of g*wDT, with 1.0≤|g|1.5.

It is noted that the one or more servo readers are referred to as servo readers in view of their deployment for deriving one or more of lateral position, velocity, gain or timing information while the data track they are reading from may in one embodiment even contain no specific servo patterns at all but data only. Still, the main purpose of the servo readers is to derive the subject information. In the same way, the one data reader the servo readers are assigned to may in one embodiment even read no data at all but servo patterns only in case the data track the data reader is supposed to read from is completely written with servo information only. However, in typical embodiments this data track may also contain data written thereto.

In one embodiment each servo reader of the servo reader arrangement has the same width as a data reader, which width may be less but close to the width of a data track. Each servo reader is assumed to be laterally offset from the one data reader by e.g., half of the data track width. In an ideal operational mode, the one data reader may be centered on an assigned data track and one servo reader of the servo reader arrangement is centered on the edge between the subject data track and an adjacent data track. In this scenario, the readback signal of the one data reader exclusively contains a waveform stemming from data or servo patterns written to the assigned data track while the readback signal of the servo reader shows a superposition of two waveforms, a first waveform of which is the same waveform the data reader supplies in its readback signal given that the servo reader covers nearly half of this data track, and another waveform stemming from data or servo patterns in an adjacent data track which the servo reader also covers nearly half. Hence, the servo reader and the one data reader show the very same waveform in their respective readback signals, however, the readback signal of the servo reader contains additional signal components from the adjacent data track. By means of correlating the readback signal of the servo reader with the readback signal of the one data reader, a correlation between the two waveforms is obtained. By evaluating e.g., an energy of the correlation signal at the output of the correlator, and by applying the knowledge about the offset between the servo reader and the one data reader, a lateral position of the data reader and hence the tape head assembly relative to the assigned data track can be determined. In a different embodiment, the readback signal of the servo reader may be correlated with the known waveform representing the servo pattern in the subject servo track. Preferably, the readback signal of the one data reader may also be correlated with the known waveform. An evaluation of the energy of any of the correlation signal may be used for determining the current lateral position of the tape head assembly with respect to the subject data track.

Whenever the tape head assembly leaves this ideal operational mode with the one data reader being centered on the assigned data track, this data reader may become laterally deviated from its central position on the assigned data track. In the following, a sample deviation of a quarter of the data track width is assumed in a positive lateral direction into which the servo reader is arranged offset from this data reader. Hence, the servo reader is also off-centered from the edge between the data track and the adjacent data track by a quarter of the data track width owed to the mechanical coupling of the servo reader and the one data reader. In this scenario, the one data reader covers the assigned data track still to nearly three quarters of its width, and nearly covers a quarter of the adjacent data track. The servo reader in turn covers nearly a quarter of the data track and nearly three quarters of the adjacent data track. Hence, when correlating the readback signals of the one data reader and the servo reader with each other or with the known waveform representing the servo pattern in the data track, there still will be a nonzero correlation signal, however, at a lower magnitude compared to the centered position of the tape head assembly. The correlation signal may again be used for determining the then new lateral position or the deviation from the centered position respectively. The known geometrical arrangement of the data reader and the servo reader allows for reliably determining a maximum lateral deviation of up to half the data track width.

In case the servo reader arrangement contains two servo readers wherein a first one of the two servo readers is laterally offset by a positive offset value and a second one of the two servo readers is laterally offset by a negative offset value, a deviation of the one data reader and hence the tape head assembly from a lateral centered position of more than half of the data track width can be reliably detected, and in particular a deviation up to a full data track width. Assuming the same dimensioning of the data reader, the servo reader and the data track as above and having a second servo reader added which is laterally offset from the one data reader by minus half of the data track width, a deviation of a maximum of up to plus/minus a data track width can be reliably detected. In this embodiment, each servo reader readback signal is correlated with the readback signal of the one data reader or with the known waveform. By means of evaluating and comparing the energy of the two correlation signals obtained by correlating the readback signal of the data reader with the readback signal of each servo reader, the lateral deviation and its direction can be determined. A correlation of the readback signals of the two servo readers may allow for additional information as to the lateral deviation and its direction.

In another embodiment, two servo reader arrangements are provided wherein the servo reader arrangements are assigned to a dedicated data reader each. Each servo reader arrangement preferably contains two servo readers, wherein the servo readers of the one servo reader arrangement are offset from the one data reader by a positive and a negative offset value respectively, and the servo readers of the other servo reader arrangement are offset from the other one data reader by a positive and a negative offset value respectively.

In view of the offset of the servo readers with one or more of the data readers, the servo readers are arranged in at least one dedicated row in the tape head assembly different to the one or more rows the data readers of the set are arranged in. Different rows are meant to be arranged at different longitudinal positions in the tape head assembly, such that in one embodiment, all the data readers are arranged in a common row while all the servo readers are arranged in a different row longitudinally offset from the data reader row.

As a result, the tape head assembly containing the set of data readers, the servo readers, and possibly the set of data writers no longer spans the entire width of a data band between two servo bands (if any) but only spans a portion of such width. This is advantageous since a lateral expansion or contraction of the tape storage medium in response to environmental effects such as variations in temperature and/or humidity affects the reading and/or writing from/to the tape storage medium less than in serpentine reading/recording with a tape head assembly with a wider span. However, given that the tape head assembly no longer spans the entire data band and may have access to servo information prerecorded in the servo bands, the presently introduced concept of the servo reader arrangement is desired given that the tape head assembly may in view of its low lateral span require to adjust its lateral position without the aid of such servo bands even if these were provided.

As far as the aspect of the method for operating a tape storage system is concerned, readback signals from the servo reader arrangement are received simultaneously to receiving the readback signals from the set of data readers. The servo reader arrangement contains one or more servo readers arranged laterally offset from one of the data readers by less than the width of a data track. At least one of lateral position, velocity, gain and timing information is determined dependent on the readback signals of each servo reader, and preferably in addition dependent on the readback signal of the one data reader. In another embodiment, there may be readback signals received from another servo reader arrangement assigned to another one of the data readers simultaneously to receiving the readback signals from the set of data readers. The other servo reader arrangement may contain at least one servo reader being laterally offset from of the other one data reader by less than the width of a data track, and preferably two servo readers are laterally offset therefrom, one by a positive and one by a negative offset value. The at least one of lateral position, velocity, gain and timing information may be determined dependent on the readback signals of all the servo readers in the servo reader arrangements, and preferably in addition dependent on the readback signals of the one and the other one data reader.

For extracting the subject information from the various readback signals a correlation is applied between the readback signal of each servo reader of a common servo reader arrangement and the readback signal of the assigned one data reader, or between each readback signal of the servo readers and possibly the one data reader with the known waveform each. As indicated above, in case two of the readers out of the servo readers and the one data reader at least partly cover the same data track, the associate readback signals at least contain the same waveform component resulting in a nonzero correlation signal in the assigned correlator. The comparison of the energy of the auto-correlated components in the various correlation signals may allow for determining the lateral position, i.e., the deviation from the centered position including a direction of the deviation.

The lateral position and/or deviation may finally be used for controlling an operation of the tape storage system during writing and/or reading data to/from the tape storage medium, e.g., for repositioning the tape head assembly such that the data readers and/or data writers are repositioned on their respective data track centers, or for repositioning the tape head assembly at the end of the tape storage medium for reading and/or writing from/to another data sub-band in a reverse tape motion direction.

Given that the tape storage medium typically is a magnetic storage medium, data and servo patterns if any in the data tracks are represented by magnetic transitions along the data tracks. Such magnetic transitions represent a waveform in the readback signal of a data reader. In this context it is emphasized, that the waveform shall encompass a representation of the subject signal in both, the time domain and the frequency domain. In one embodiment, the data track the one data reader is supposed to read from may also or entirely contain servo information in form of one or more different servo patterns written to this data track. The waveforms of a servo pattern may in one embodiment result from a predefined pseudo noise sequence written to the data track. Specifically, a pseudo noise sequence comprises a sequence of binary symbols and as such a defined bit pattern of a given length of binary symbols. In a different embodiment, a predefined waveform resulting from reading an underlying servo pattern may be characterized in the spectral domain by a defined frequency of magnetic transitions in the subject data track. Specifically, a waveform with a defined frequency in the spectral domain is a periodic waveform in the time domain, and preferably a sinusoidal waveform in the time domain.

In case of different servo patterns used the corresponding waveforms in the readback signal may be orthogonal or quasi-orthogonal to each other. Orthogonality in adjacent track recording preferably is fulfilled if a product of the spectrum or a correlation of the time function of the subject waveform with a waveform in an adjacent track is zero. This means, that a correlation between any two different waveforms preferably is zero or nearly zero as computed either in the time domain or in the spectral domain for all different waveforms applied, such that the waveforms preferably used in the different data tracks, and hence their underlying magnetic transition schemes defining the different servo patterns, are preferably orthogonal or quasi-orthogonal. This feature may be used in particular when servo patterns are written to adjacent data tracks at the same longitudinal positions of these data tracks. The servo readers of the servo reader arrangement may then, for example, also extract information by the correlation of the waveforms stemming from the different servo patterns in the adjacent data tracks being superimposed in the readback signal of a servo reader, and possibly the one data reader.

In case different bit patterns representing pseudo noise sequences are used as servo patterns, the orthogonality of waveforms resulting from reading the different pseudo noise sequences is preferably verified in the time domain. The readback signals of the data and/or servo readers then are preferably analyzed in the time domain by means of correlation operations. The different pseudo noise sequences used in one embodiment are preferably characterized by good cross-correlation properties. Such sequences in one example may be Gold sequences. Alternatively, the preferably at least two pseudo noise sequences used may originally be derived from a single pseudo noise sequence with good autocorrelation properties. Such pseudo noise sequence may include Barker codes, complementary sequences or maximal length sequences. In this embodiment, the servo patterns of two adjacent data tracks are written with the same pseudo noise sequence, however, with a phase offset and/or opposite polarities. An advantage of this scheme is that a detector may include only a single sequence correlator. In case different defined frequencies of magnetic transitions are used as servo patterns, the orthogonality of waveforms resulting from reading the different frequencies of magnetic transitions is preferably verified in the spectral domain, by, e.g., Discrete Fourier Transform operations.

For each of the above described variants, the underlying servo patterns may preferably belong to a class of energy based servo (EBS) patterns. If such servo patterns of adjacent data tracks are read by a single data and/or servo reader covering multiple of the data tracks while reading, the readback signal from the data and/or servo reader provides different energies of the different waveforms present in the readback signal subject to the coverage of the different data tracks. By means of estimating and/or evaluating the energies of the different waveforms in the readback signal and specifically by building ratios between the various energies, additional servo information may be acquired. Any such servo patterns used may aim at fast and accurate acquisition of lateral position information. The servo patterns preferably have an inherent high density in magnetic transitions—this is why these servo patterns here also are referred to as high density patterns—in order to enable swift and accurate estimates of servo channel parameters such as the lateral position, thereby enabling improved tape head positioning at a much wider tape velocity range and supporting for larger bandwidth head actuation.

In an embodiment, the tape storage medium to be read additionally contains dedicated servo tracks with the set of data tracks being arranged between these two servo tracks. The servo tracks may exclusively be written and/or preformatted with servo patterns with no data interspersed. The width of a servo track may correspond to the width of a data track. Preferably, the tape head assembly may include at least one additional servo reader for reading from each servo track. The dedicated servo tracks may provide additional information such as timing information and/or other information such as LPOS (longitudinal position information), servo band ID, servo track ID, manufacturing information etc.

Servo patterns arranged in the data tracks, if any, are written together with the data, i.e., written during the operation of the tape storage medium in a tape drive which implies that the servo sections are written by the very same data writers that do write the data to the set of data tracks. The servo patterns of dedicated servo tracks, if any, may preferably be preformatted servo patterns. Preformatting is typically executed by the tape manufacturer.

FIG. 1 schematically illustrates a tape storage system in a top view on a section of a tape TP that passes a tape head assembly THA. The tape TP has a longitudinal extension in x direction and a lateral extension in y direction. The longitudinal extension in x direction coincides with a tape motion direction TMD, assuming there is no tape skew. Servo bands SB and data bands DB extend along the longitudinal extension of the tape TP. Each data band DB is arranged in between two servo bands SB. Each data band DB contains multiple sets of adjacent data tracks not shown in detail wherein preferably each set of adjacent data tracks of a data band DB is written and/or read simultaneously in case the tape head assembly THA comprises a number of data writers and data readers respectively which number preferably corresponds to the number of data tracks in each set. A set of adjacent data tracks that is simultaneously written and/or read is referred to as a data sub-band. Each servo band SB contains servo patterns arranged along the longitudinal extension of the tape TP.

Figure 2:
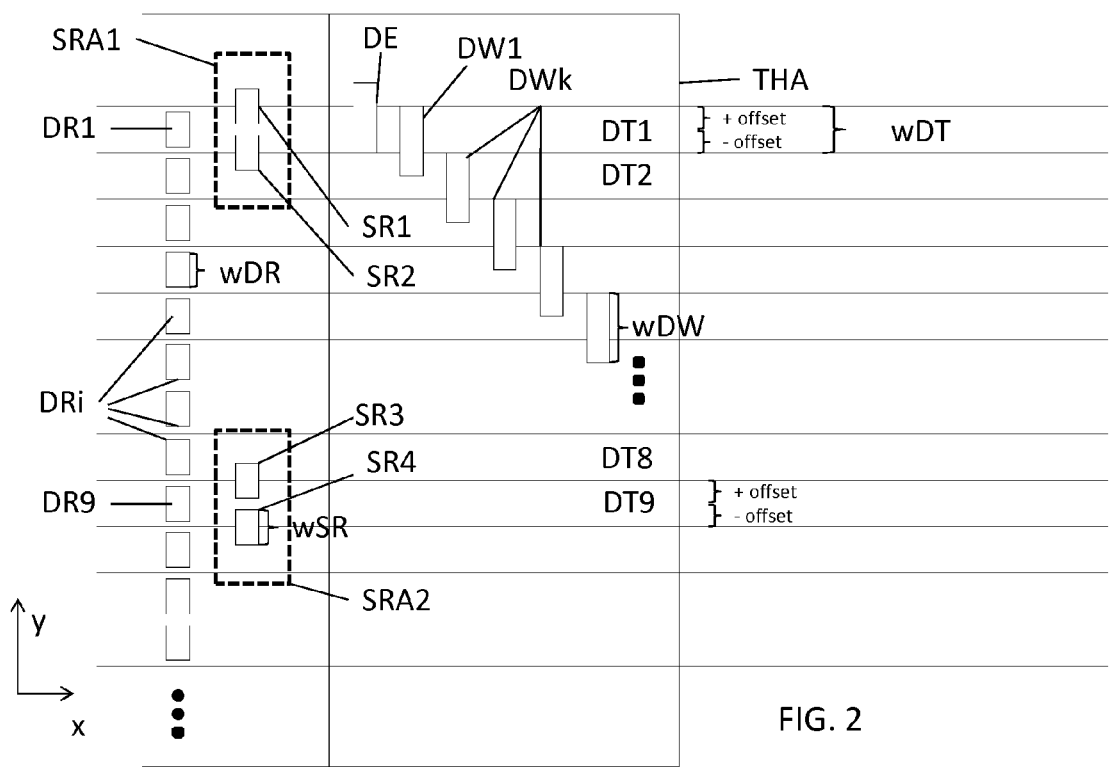
FIG. 2 is a top view of a schematic tape storage system according to an embodiment of the present invention.

FIG. 2 illustrates the top view of a data sub-band, e.g., the data sub-band of FIG. 1 the tape head assembly THA currently covers. The data sub-band as shown may contain a set of e.g., sixteen adjacent data tracks $DT_j$, j=[1 . . . 16]. The tape head assembly THA contains a corresponding number I of sixteen data readers $DR_i$, i=[1 . . . 16] in a set for simultaneous reading from the sixteen data tracks $DT_j$. Each data track $DT_j$ has a width wDT in y-direction. Each data reader $DR_i$ of the tape head assembly THA has a width wDR less than the width wDT of each data track $DT_j$, and presently ~0.8*wDT such that each data reader $DR_i$ spans less than one data track $DT_j$ when being centered on a data track $DT_j$. The data readers $DR_i$ are arranged in a common row. Preferably, the data readers $DR_i$ are embodied as magneto resistive (MR) elements.

The tape head assembly THA further contains two servo reader arrangements SRA1 and SRA2. Each servo reader arrangement SRA1, SRA2 includes two servo readers SR1, SR2 and SR3, SR4 respectively. All the servo readers $SR_n$ are arranged in a common row in the tape head assembly THA which row is longitudinally offset from the row the data readers $DR_i$ are contained in. The servo reader SR1 has a positive offset (+ offset) with respect to the one data reader DR1 by plus half of the width wDT of a data track while the servo reader SR2 has a negative offset (− offset) with respect to the one data reader DR1 by minus half the width wDT of a data track. The servo reader SR3 has a positive offset (+ offset) with respect to the other one data reader DR9 by plus half of the width wDT of a data track while the servo reader SR4 has a negative offset (− offset) with respect to the other one data reader DR9 by minus half of the width wDT of a data track. Each servo reader $SR_n$ has a width wSR equal to the width wDR of a data reader, i.e., ~0.8*wDT. The servo readers SRn and the data readers DRi are arranged on separate layers of the tape head assembly THA manufactured in thin film technology.

The tape head assembly THA further contains a number K of sixteen data writers DWk, k=[1 ... 16], each with a width wDW exceeding the width wDT of a data track DTj. The data writers DWk are arranged offset from each other in the longitudinal direction x, i.e., each data writer DWk is arranged at a different longitudinal position x on the tape head assembly THA. Given that the data writers DWk are designated to write adjacent data tracks DTj that are arranged close to each other, such staggered arrangement leads to a reduced crosstalk during writing. Given that each data writer DWk has a width wDW exceeding the width wDT of a data track, data writer DWk assigned to write a data track DTj also overwrites a small portion of the adjacent data track DT(j+1). This approach is referred to as shingled writing in order to enable writing data tracks at small widths. The data readers DRi and the data writers DWk are mechanically coupled in the tape head assembly THA.

In one embodiment, all data tracks DTj of the set may solely contain data. In another embodiment such as shown in FIG. 2, at least the first data track DT1 may contain servo information encoded in servo patterns. This servo information may be factory preformatted. In this case, the preformatted servo information may become overwritten when writing data tracks by means of the data writer DW1. In order to allow for a clean overwriting, a data eraser DE may be included in the tape head assembly THA. The data eraser DE may generate a clean edge adjacent to the data track DT1. Alternatively, some or all of the factory-preformatted servo information may be left unmodified when writing the tape. This approach may avoid the accumulation of "written-in" noise in the servo signal and hence avoids degraded lateral and/or longitudinal sub-band placement when overwriting sub-bands many times, and may also simplify appended write operations.

In an ideal operating mode as shown in FIG. 2, the data readers DRi are centered on the data tracks DTj, while the servo readers SRn are centered on edges between adjacent data tracks DTj. In this scenario the servo readers SR1 and SR2 extract information from data track DT1 and an adjacent track each, whereas the servo readers SR3 and SR4 extract information from data track DT9 and an adjacent track each. The data tracks DT1 and DT9 may include data and/or servo information, which servo information may be provided by servo patterns representing pseudo noise sequences or sinusoidal waveforms, for example. Feedback for both a track- and skew-following mechanism may in one embodiment be obtained by using the same data or servo patterns. Furthermore, some of the other data tracks DTj of the set may in another embodiment also include interspersed predefined i.e., "known" servo patterns to further enhance servo signal extraction and/or for representing, e.g., LPOS and data sub-band ID information.

During an initial positioning of the tape head assembly, an initial coarse positioning is followed by finding the desired data sub-band which may be achieved by using some or all of the data readers DRi of the set to look for a servo pattern. Once a data sub-band ID is identified, a distance of the current tape head assembly position from a target position is estimated, and a control effort is generated to move the tape head assembly THA towards the target position until the correct tape head assembly placement is achieved.

Figure 3:
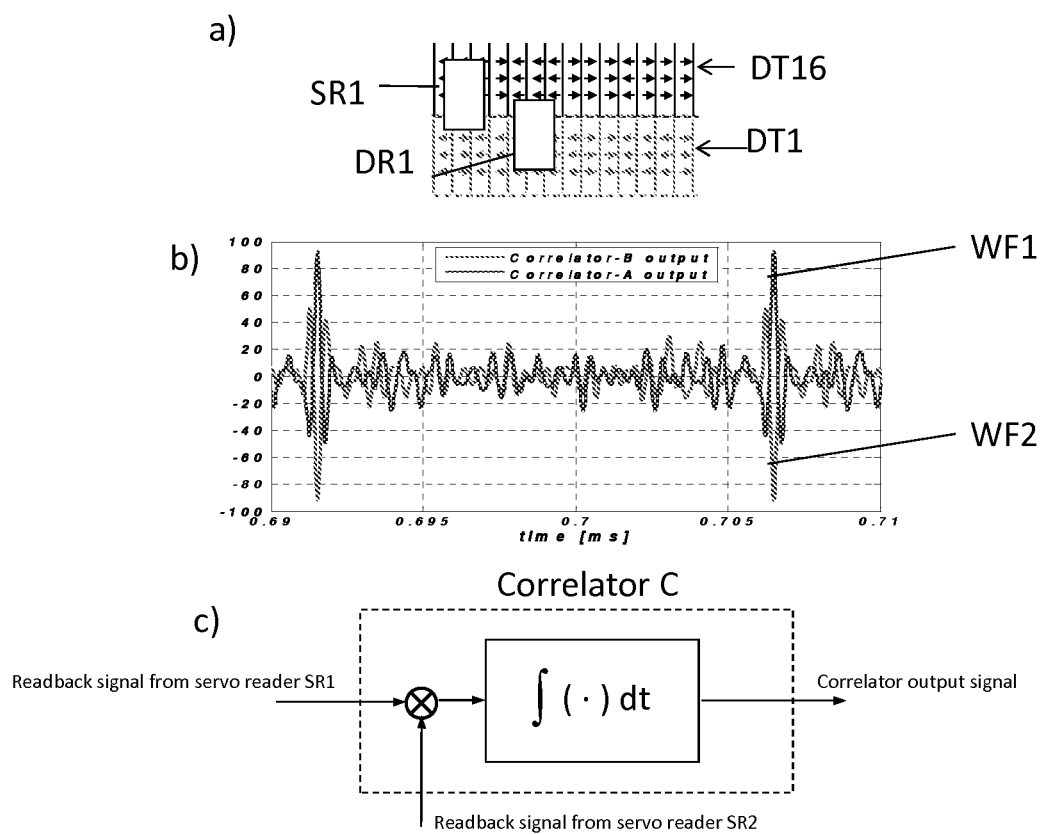
FIG. 3 illustrates top views of a schematic tape storage system according to an embodiment of the present invention, and related diagrams.

FIG. 3 illustrates the concept of extracting lateral position information from a data and servo reader arrangement such as shown in FIG. 2 with respect to a single servo reader arrangement SRA1 including a single servo reader SR1 only for illustration purposes. Diagram 3a) shows the data track DT1 of the present data sub-band and a data track DT16 of another data sub-band on top of the present data sub-band. The data reader DR1 is normally positioned on a center of the associate data track DT1. For illustration purposes, data reader DR1 is shown offset from the center of the associated data track DT1 in diagram 3a). The data track DT1 may include data and/or pseudo noise sequences serving as servo pattern. Similarly, the data track DT16 of the previous data sub-band may contain data and/or pseudo noise sequences, and may have been partially overwritten (shingled) by DT1 of the current data sub-band.

For illustration purposes, in diagram 3b) the output signals of two correlators A and B are shown, wherein correlator A yielding signal WF1 correlates the readback signals of the data reader DR1 reading a pseudo noise sequence PN_A written on track DT1 and a reference waveform representing the pseudo noise sequence PN_A, and correlator B yielding signal WF2 correlates the readback signal of the servo reader SR1 reading a pseudo noise sequence PN_B orthogonal to PN_A written on track DT16 and a reference waveform representing the pseudo noise sequence PN_B. The positioning of the data reader DR1 and of the servo reader SR1 is shown in diagram 3a). Peaks in the correlator output signals WF1 and WF2 originate from the correlation of the data or servo patterns PN_A and PN_B written on the data tracks DT1 and DT16 with the corresponding reference waveforms. The amplitude of the peaks is the same for the two correlator output signals, which indicates that the overlapping of the data reader DR1 with the data track DT1 is the same as the overlapping of the servo reader SR1 with the data track DT16, as assumed in diagram 3a). In an embodiment, shown in diagram 3c), the readback signal of the servo reader SR1 and the readback signal of the servo reader SR2 are continuously correlated by a correlator C. Note that the positioning of the data reader DR1 and of the servo readers SR1 and SR2 relative to the data tracks DT1 and DT2 as illustrated in FIG. 2 would result in the largest amplitude of the output signal of correlator C, whenever the signals written in data tracks DT1, DT2, and DT16 have zero mean and are uncorrelated.

Figure 4:
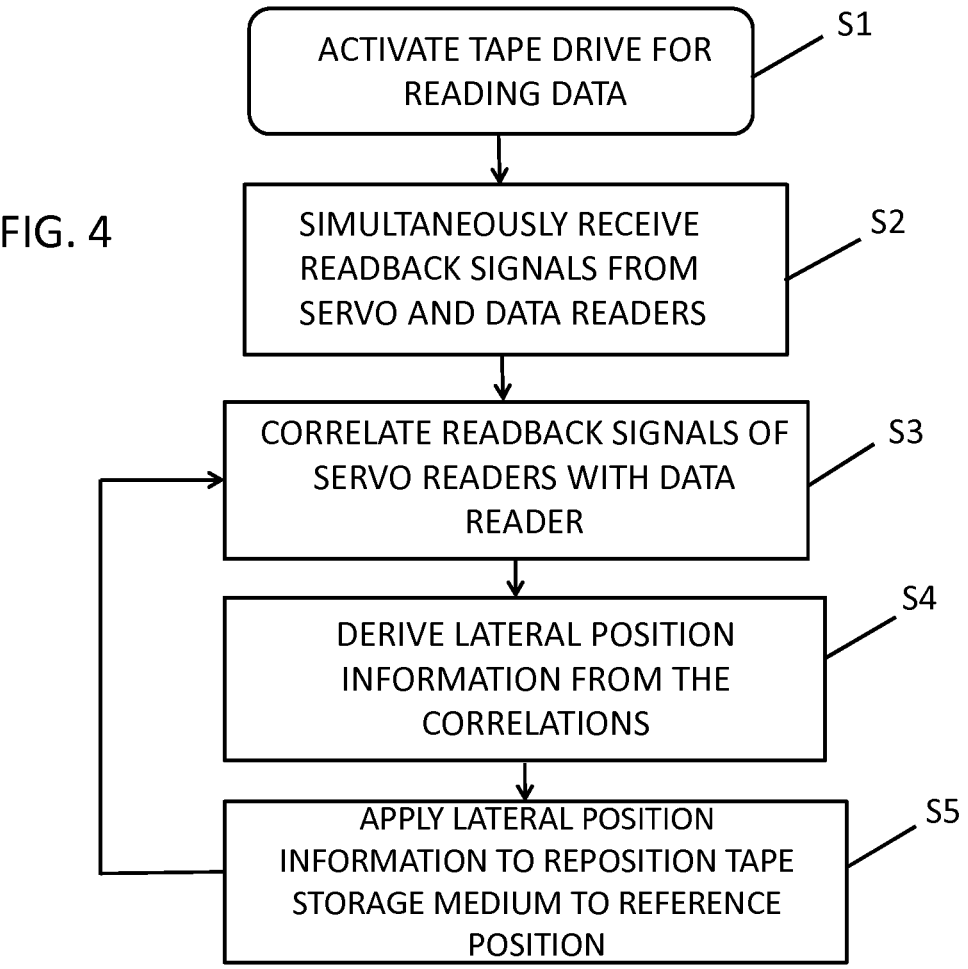
FIG. 4 is a flowchart representing a method for operating a tape storage system according to an embodiment of the present invention.

FIG. 4 shows a flow chart according to an embodiment of the present invention. In step S1, the method is started, for example, by activating the tape drive for reading data from a tape storage medium in a tape cartridge inserted into the tape drive. It is assumed that the tape is already positioned at the desired lateral and longitudinal position. Then, while in step S1 the tape is already moved at a desired tape velocity, in step S2 readback signals are simultaneously received from the servo readers of a servo reader arrangement and from the set of data readers specifically including the one data reader the servo readers of the servo reader arrangement are offset from by less than the width of a data track. In step S3 the readback signals of the servo readers of the same servo reader arrangement are correlated with the readback signal of the one data reader and are correlated with each other. In step S4 lateral position information is derived from the result of the various correlations and in step S5 the lateral position information is applied to repositioning the tape storage medium to a reference position with respect to the tape head assembly. The steps S3 to S5 are executed in iterations until the end of the tape storage medium is reached, or until the tape transport is stopped, or until a global repositioning of the tape head assembly is performed (which actions are not included in the flow chart).

Figure 5:
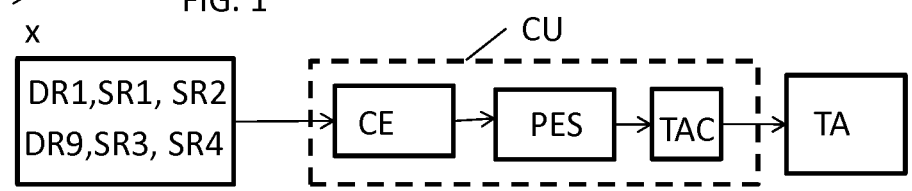
FIG. 5 is a block diagram of selected items of a tape storage system according to an embodiment of the present invention.

FIG. 5 illustrates a block diagram of a tape drive of a tape storage system according to an embodiment of the present invention, e.g., for a tape storage system according to FIG. 2. The data readers DR1 and DR9 as well as the servo readers SR1, SR2, SR3 and SR4 provide their readback signals to a control unit CU. The readback signals are received by a correlation entity CE and a lateral position value is determined from these readback signals. The lateral position value is then converted into a position error signal by a determination unit PES. A tape head actuator controller TAC translates the position error signal PES into a control signal for the tape head actuator TA, which then adjusts the lateral position of the tape head assembly which comprises the data and servo readers.

It will be understood by those skilled in the art that many modifications and permutations may be made without departing from the scope of the present invention.

As will be appreciated by one skilled in the art, aspects of the present invention may be embodied as a method for operating a tape storage system, or a computer program product, a tape head assembly and a tape storage system. Accordingly, aspects of the present invention, in particular in form of the controller/control unit, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the method, may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A tape head assembly, comprising:
a set of data readers configured to simultaneously read data from a set of adjacent data tracks of a tape storage medium, each data track having a width;
wherein the width of each data reader of the set along a lateral extension of the tape head assembly is equal to or less than the width of a data track wherein the lateral extension of the tape head assembly is orthogonal to a longitudinal extension of the tape storage medium when arranged in a tape drive containing the tape head assembly spanning at least the set of data tracks during reading; and
a servo reader arrangement containing at least one servo reader arranged laterally offset from one of the data readers by less than the width of a data track,
wherein each servo reader of the servo reader arrangement is offset from the one data reader by an offset=f*wDT, with wDT being the width of a data track, and $0.3 \leq |f| \leq 0.7$.

2. The tape head assembly of claim 1, wherein:
each servo reader of the servo reader arrangement has a width equal to the width of a data reader; and
the number of servo readers is less than half the number of the data readers in the set.

3. The tape head assembly of claim 1, wherein:
each data reader has a width wDR =d*wDT, with wDT being the width of a data track, and $0.8 \leq d \leq 1$.

4. The tape head assembly of claim 1, wherein the servo reader arrangement contains two servo readers, wherein a first one of the two servo readers is laterally offset by a positive offset value and a second one of the two servo readers is laterally offset by a negative offset value.

5. The tape head assembly of claim 1, wherein the offset |f|=0.5.

6. The tape head assembly of claim 1, wherein each servo reader of the servo reader arrangement has a width less than the width of a data track.

7. The tape head assembly of claim 1, containing another servo reader arrangement containing at least one servo reader, and preferably two servo readers arranged laterally offset from another one of the data readers by less than the width of a data track.

8. The tape head assembly of claim 1, wherein:
   the data readers of the set are arranged in at least one row in the tape head assembly; and
   the one or more servo readers are arranged in at least one different row in the tape head assembly at a different longitudinal position than the at least one row containing the data readers.

9. A tape storage system comprising a tape head assembly according to claim 1 and a tape storage medium, the tape storage medium comprising at least one set of data tracks along a longitudinal extension of the tape storage medium and adjacent to each other, and at least one data track of the set comprising one of servo sections or data sections alternating with servo sections.

* * * * *